(12) United States Patent
Li et al.

(10) Patent No.: US 11,924,845 B2
(45) Date of Patent: Mar. 5, 2024

(54) SATELLITE UPLINK MANAGEMENT SYSTEM

(71) Applicant: AMAZON TECHNOLOGIES, INC., Seattle, WA (US)

(72) Inventors: Baosheng Li, Kirkland, WA (US); Sandeep Ahluwalia, Gaithersburg, MD (US); Deepak, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 163 days.

(21) Appl. No.: 17/304,962

(22) Filed: Jun. 29, 2021

(65) Prior Publication Data
US 2022/0417981 A1    Dec. 29, 2022

(51) Int. Cl.
*H04W 72/23*  (2023.01)
*H04W 72/0446*  (2023.01)
*H04W 72/21*  (2023.01)
*H04W 84/06*  (2009.01)

(52) U.S. Cl.
CPC ....... *H04W 72/23* (2023.01); *H04W 72/0446* (2013.01); *H04W 72/21* (2023.01); *H04W 74/0841* (2013.01); *H04W 84/06* (2013.01)

(58) Field of Classification Search
CPC . H04W 72/23; H04W 72/0446; H04W 72/21; H04W 74/0841; H04W 84/06; H04B 7/18539
See application file for complete search history.

(56) References Cited

U.S. PATENT DOCUMENTS

| 10,547,375 B1 * | 1/2020 | Lyer ..................... H04W 52/34 |
| 2010/0040028 A1 | 2/2010 | Maheshwari et al. |
| 2017/0279701 A1 * | 9/2017 | Ahmadzadeh .......... H04L 43/12 |

(Continued)

FOREIGN PATENT DOCUMENTS

| EP | 3914009 A1 | 11/2021 |
| WO | 2021031089 A1 | 2/2021 |

(Continued)

OTHER PUBLICATIONS

"5G/NR—Scheduling", ShareTechnote, 5 pgs. Retrieved from the Internet: URL: http://www.sharetechnote.com/html/5G/5G_Scheduling.html.

(Continued)

*Primary Examiner* — Rina C Pancholi
(74) *Attorney, Agent, or Firm* — Lindauer Law, PLLC

(57) ABSTRACT

A satellite provides communication between user terminals (UTs) and ground stations that connect to other networks, such as the Internet. Because the satellite is within range of many UTs at any given time, many UTs are in contention to use an uplink to send upstream data to the satellite. This saturates a random-access channel (RACH) on the uplink. When a UT has data to uplink, it sends a short buffer data status (SBDS) message using the RACH. The minimal size of the SBDS facilitates use of a non-orthogonal multiple access uplink. Based on the SBDS, the satellite allocates a grant to the UT to use the uplink. Additional messages from the UT involving buffer status may be sent using the granted uplink. Unsolicited grants may be issued to the UT based on analysis of uplink and downlink traffic. If needed, the RACH may still be used to request additional grants.

20 Claims, 8 Drawing Sheets

(56) References Cited

U.S. PATENT DOCUMENTS

2020/0029283 A1* 1/2020 Lei .................. H04W 72/21
2022/0225415 A1* 7/2022 Shrestha ............. H04B 7/1853

FOREIGN PATENT DOCUMENTS

| WO | 2021064150 A1 | 4/2021 | | |
| WO | WO-2021064150 A1 * | 4/2021 | ........ | H04W 72/1268 |
| WO | WO-2021231119 A1 * | 11/2021 | ........ | H04W 28/0278 |
| WO | WO-2021233601 A1 * | 11/2021 | | |

OTHER PUBLICATIONS

"MAC Structure Overview", ShareTechnote, 17 pgs. Retrieved from the Internet: URL: http://www.sharetechnote.com/html/MAC_LTE.html#MAC_Structure_Overview.

Brown, et al., "Predictive Resource Allocation in the LTE Uplink for Event Based M2M Applications", The University of Newcastle Callaghan, School of Electrical Engineering and Computer Science, 6 pgs. Retrieved from the Internet: URL: https://eprints.usq.edu.au/35200/1/Brown_Khan_AV.pdf.

Deering, S. et al., "Internet Protocol, Version 6 (IPv6) Specification", RFC 8200, DOI 10.17487/RFC8200, Jul. 2017, 44 pages. https://www.rfc-editor.org/rfc/pdfrfc/rfc8200.txt.pdf.

Ding, Zhiguo, "Non-Orthogonal Multiple Access (NOMA): Evolution towards 5G Cellular Networks", School of Computing and Communications, Lancaster University, Apr. 28, 2016, 28 pgs. Retrieved from the Internet: URL: https://www.lancaster.ac.uk/staff/dingz/NOMA.pdf.

Emmelmann, Marc, "TCP/IP Over Satellite", Jul. 24, 2000, 9 pgs. Retrieved from the Internet: URL: http://www.emmelmann.org/Library/Papers_Reports/docs/Tcplp_overSatellite/Tcplp_overSatellite.pdf.

Kent, S., "IP Authentication Header", RFC 4302, DOI 10.17487/RFC4302, Dec. 2005, 36 pages. https://www.rfc-editor.org/rfc/pdfrfc/rfc4302.txt.pdf.

Li, et al., "Predictive Pre-allocation for Low-latency Uplink Access in Industrial Wireless Networks", Shanghai Jiao Tong University, Department of Electronics, and Key Laboratory of System Control and Information Processing, Ministry of Education of China, Jan. 6, 2018, 9 pgs. Retrieved from the Internet: URL: https://arxiv.org/pdf/1801.06451.pdf.

Moskowitz, R. et al., "Host Identity Protocol Version 2 (HIPv2)", RFC 7401, DOI 10.17487/RFC7401, Apr. 2015, 130 pages. https://www.rfc-editor.org/rfc/pdfrfc/rfc7401.txt.pdf.

Dejonghe, Oliver, "International Search Report and the Written Opinion of the International Searching Authority dated Nov. 16, 2022", Patent Cooperation Treaty Application No. (PCT/US22/72541, Patent Cooperation Treaty, dated Nov. 16, 2022.

"3GPP TS 38.321 V16.4.0 (2021003)", Technical Specification , 3rd Generation Partnership Project; Technical Specification Group Radio Access Network; NR; Medium Access Control (MAC) protocol specification (Release 16), Mar. 2021, 157 pgs. Retrieved from the Internet: URL: https://www.3gpp.org/ftp/Specs/archive/38_series/38.321/38321-g40.zip.

Eich, Martine, "Invitation to Pay Additional Fees dated Sep. 19, 2022", Patent Cooperation Treaty Application No. PCT/US2022/072541, Patent Cooperation Treaty, dated Sep. 19, 2022.

* cited by examiner

SCHEDULING INPUT DATA 176

TRANSFERRED DATA 802
(E.G. UPSTREAM DATA 112 OR DOWNSTREAM DATA 142)

PACKET FIXED HEADER 812

| PARAMETER 804 | VALUE 806 |
|---|---|
| VERSION | 6 |
| TRAFFIC CLASS | 001001 |
| FLOW LABEL | 10100101.... |
| SOURCE ADDRESS | 2001:0DB8: |
| DESTINATION ADDRESS | 2001:0EB6: |
| ... | ... |

PACKET EXTENSION HEADER 814

| PARAMETER 804 | VALUE 806 |
|---|---|
| ROUTING | 001010 |
| FRAGMENT | 011101 |
| AUTHENTICATION HEADER | 1111011 |
| ENCAPSULATING SECURITY | 1111111 |
| DESTINATION OPTIONS | 11101 |
| HOST IDENTITY PROTOCOL | 0010011 |
| ... | ... |

PACKET PAYLOAD 816

SHORT BUFFER DATA STATUS 190

LONG BUFFER DATA STATUS 192

TRANSFER HISTORY DATA 820

| PARAMETER 804 | VALUE 806 |
|---|---|
| DIRECTION (UP/DOWN) | 1 |
| SOURCE ADDRESS | 2001:0EB6: |
| DESTINATION ADDRESS | 2001:0DB8: |
| BUFFER GROUP | 2 |
| DATA TRANSFERRED/TIME | 127 KB/S |
| ... | ... |

CONTENT PROVIDER DATA 136

| PARAMETER 804 | VALUE 806 |
|---|---|
| SOURCE ADDRESS | 2001:0DB8: |
| DESTINATION ADDRESS | 2001:0EB6: |
| EXPECTED DURATION | 302400 S |
| EXPECTED END TIME | 21:57:00 |
| EXP. DL DATA RATE/TIME | 1,495 KB/S |
| EXP. UL DATA RATE/TIME | 125 KB/S |
| PROTOCOL | TCP |
| PERIODICITY | 100 MS |
| ... | ... |

GRANT DATA 172
(PREVIOUSLY SENT)

SATELLITE UPLINK MANAGEMENT SYSTEM

BACKGROUND

A satellite may provide communication service to many user terminals. These user terminals may be in contention with one another for use of an uplink to send data from individual user terminals to the satellite.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 8 illustrates scheduling input data, according to some implementations.

Figure 1:
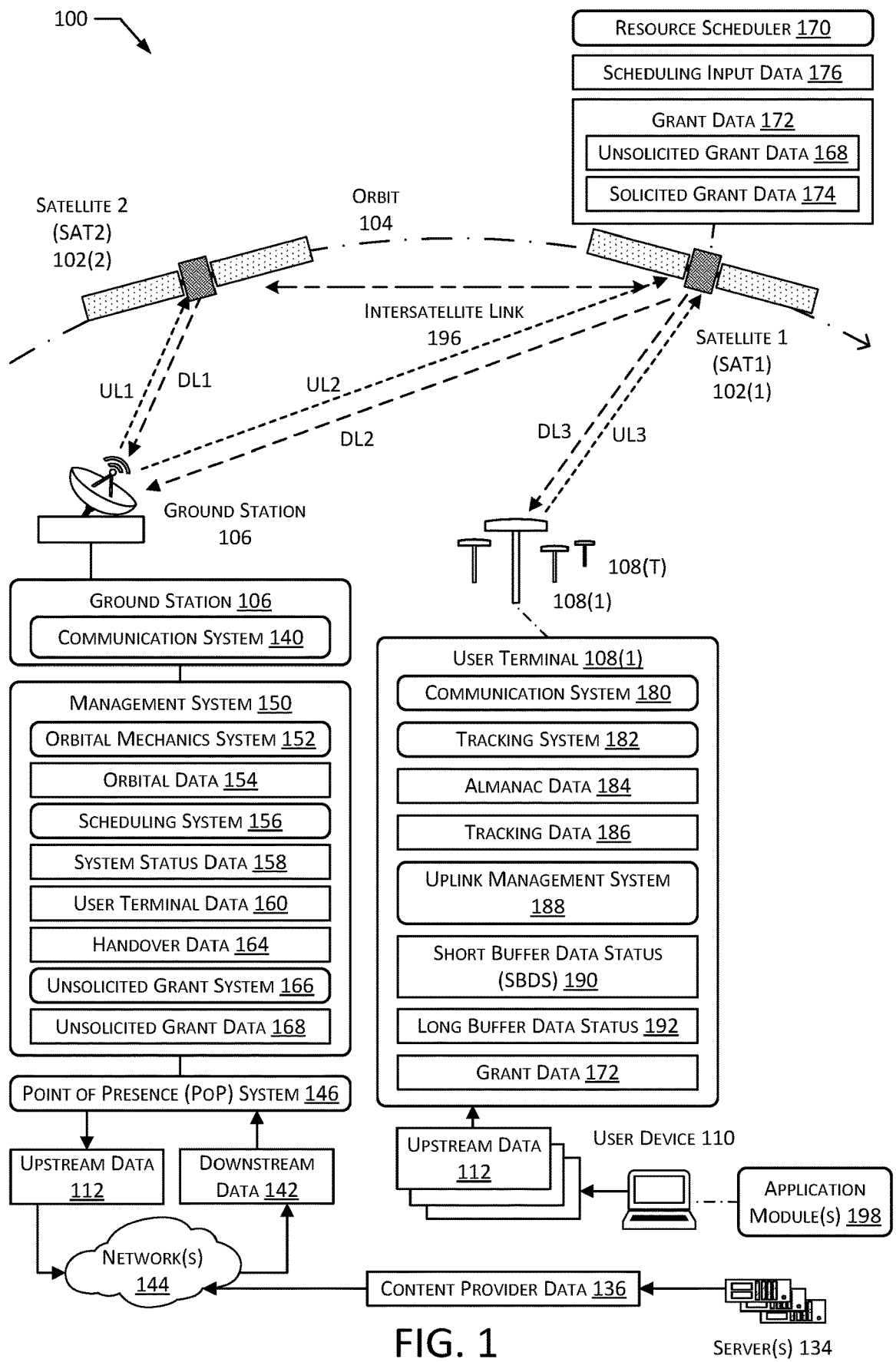
FIG. 1 illustrates a system that uses a satellite uplink management system to manage contention by user terminals for uplink resources, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large geographic coverage area of a given satellite, and a substantial number of user terminals served by each satellite, may result in an oversubscribed network that includes several congestion points that restrict the flow of network traffic. One congestion point is an uplink to the satellite, as many individual user terminals contend with each other to use the uplink to send data to the satellite.

The satellites provide communication services between devices, such as user terminals (UT) located on or near a body such as the Earth. For example, a first UT on a first geographic location (geolocation) on the Earth may send upstream data to a first satellite that is in range of the first UT. The first satellite may send the upstream data to a ground station, another satellite, and so forth. For example, the first satellite may send the upstream data to a ground station that in turn sends the upstream data to a point-of-presence (PoP). The PoP may then send the upstream data to a device on another network, such as a server on the Internet.

Likewise, downstream data destined for the first UT may be received at the PoP. The PoP sends the downstream data to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determines how long a satellite is within range of the UT is the orbital period of the satellite, that is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite. For example, as mentioned earlier, an individual satellite is only within communication range of a UT for a few minutes. Efficient management of the uplink becomes particularly important in this dynamic environment as poor management reduces throughput on the uplink. Reduced throughput may result in data being delayed, dropped, or other unacceptable outcomes.

Traditional techniques of managing an uplink are not intended for and so do not scale well to large numbers of UTs, particularly when those UTs are sending large quantities of data. For example, a sparse number of terminals in a conventional satellite system may each be assigned fixed uplink resources in advance. However, this system is inflexible and results in unused capacity in the event a UT has no data to send. In another example, a sparse number of terminals making relatively short transmissions may attempt to use the uplink by transmitting at any time. However, this approach fails as the number of UTs transmitting on the uplink increases, the duration of transmissions increase, or both. As a result, traditional techniques of managing an uplink are infeasible in a large satellite network that may involve thousands of satellites and millions of UTs.

Described in this disclosure is a satellite uplink management system using solicited and unsolicited grants of uplink resources. A UT may use a random access channel (RACH) implementing a non-orthogonal multiple access (NOMA) to send a short buffer data status (SBDS) message to the satellite. The SBDS is relatively short, such as 8 bits in length, minimizing the overall size of the data transmitted. The SBDS provides information about a characteristic of the upstream data enqueued for transmission, such as priority, and approximate amount of upstream data enqueued for transmission on the uplink. This short length of the SBDS minimizes use of the RACH while still permitting operation in a NOMA channel in which transmission of multiple SBDS transmissions may overlap one another in time and frequency.

Responsive to the SBDS, a resource scheduler onboard the satellite may issue a solicited grant. The solicited grant specifies communication resources for the uplink that are assigned to the UT, such as a timeslot, frequency slot, modulation, coding scheme, and so forth. The use of the SBDS also substantially reduces overall latency by having a single transmission from the UT inform the satellite, compared to other multi-step techniques.

During operation, the UT may continue to receive upstream data to send to the satellite. The UT may send long buffer data status (LBDS) messages to the satellite. The LBDS may comprise more detailed information about the characteristics of, and amount of, upstream data. This additional information assists the resource scheduler onboard the satellite in determining the solicited grants that maintain desired service level specifications for the different characteristics of upstream data. The LBDS messages may be sent to the satellite using the previously granted uplink communication resources, avoiding the need to send a request using the RACH, and thus reducing congestion on the RACH.

The resource scheduler onboard the satellite may also issue an unsolicited grant. The unsolicited grant specifies communication resources for the uplink that are assigned to the UT, such as a timeslot, frequency slots, and so forth. The unsolicited grant may be issued based on scheduling input data. The scheduling input data may include information about previously transferred data. For example, the scheduling input data may be based on downstream data sent from the satellite to the UT, upstream data sent from the UT to the satellite, and so forth. In one implementation, a machine learning system may be trained to analyze the transferred data to predict upstream data. Based on the output from the machine learning system, an unsolicited grant may be issued.

In some implementations the scheduling input data may include content provider data that provides additional information about the data to be transferred. For example, content such as video content, streaming games, video calling, audio calling, and so forth, may be sent from a content provider server to a user device via the satellite and UT. This content may have a defined duration such as movie length, scheduling length of a video call, specified size of data, and so forth. Responsive to a request for content, a content provider may send the content provider data that indicates an expected duration of the content, expected downlink data rate, expected uplink data rate, and so forth. The resource scheduler uses the content provider data to issue unsolicited grant data. For example, unsolicited grants may be issued that are expected to be sufficient for upstream data, such as acknowledgement messages, to be returned to the server. Unsolicited grants may reduce the need to send SBDS using the RACH thus reducing congestion on the RACH. Unsolicited grants may reduce the need to send the LBDS thus reducing consumption of the uplink resources. Unsolicited grants also produce substantial reductions in overall latency. For example, to send upstream data with a solicited grant in this system, the UT sends a message (such as the SBDS or the LBDS) which travels to the satellite, is processed, and the solicited grant then travels back to the UT. In comparison, with the unsolicited grant, the unsolicited grant is used to send the upstream data.

With regard to these various techniques, the UT remains able to use the RACH to request additional uplink resources as called for by changing conditions. For example, if the UT receives additional upstream data having a highest priority, SBDS may be sent to the satellite to request additional solicited grants. The techniques may thus be operating concurrently, with solicited grants from SBDS, solicited grants from LBDS, unsolicited grants based on scheduling input data, and so forth.

By using the system and techniques described in this disclosure efficiency of a communication system using a satellite constellation is substantially improved. Uplink contention is reduced, improving throughput. Latency is also reduced, allowing UTs to send upstream data with less delay.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with its antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), ..., 102(S), each satellite 102 being in orbit 104. Also shown is a ground station 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 196 provides for communication between satellites 102 in the constellation.

One or more ground stations 106 are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network 144. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The resource scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 196 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In some implementations, the management system 150 may include an unsolicited grant system 166 that accepts scheduling input data 176 and determines unsolicited grant data 168. The scheduling input data 176 may comprise information about one or more of upstream data 112 or downstream data 142. For example, the unsolicited grant system 166 of the management system 150 may analyze the upstream data 112 to a particular UT 108 and downstream data 142 from the particular UT 108 to determine the unsolicited grant data 168. In one implementation, a machine learning system may be trained to use the scheduling input data 176 to determine if the UT 108 is likely to have upstream data 112 to transmit to the satellite 102.

During operation of the system 100, communication services provided to a UT 108 may be handed off from a first satellite 102(1) to a second satellite 102(2). In some implementations, one or more of the scheduling input data 176 or data based thereon may be transferred to the second satellite 102(2). For example, content provider data 136 may be sent to the resource scheduler 170 executing on a satellite 102(2) that is scheduled to provide communication service to the UT 108. In some implementations the scheduling input data 176 may comprise state data associated with operation of the resource scheduler 170, parameters of the machine learning system, and so forth.

The unsolicited grant data 168 is indicative of one or more parameters associated with uplink communication between the UT 108 and the satellite 102. For example, the unsolicited grant data 168 may indicate the satellite identifier, uplink frequency, assigned timeslot, signal encoding, and so forth.

The unsolicited grant system 166 of the management system 150 may send the unsolicited grant data 168 to the satellite 102 that is in communication with the UT 108. In one implementation, a resource scheduler 170 onboard the satellite 102 may then allocate uplink communication resources consistent with the unsolicited grant data 168 and then send the unsolicited grant data 168 to the UT 108. In another implementation, the resource scheduler 170 onboard the satellite 102 may receive first unsolicited grant data 168(1) from the management system 150 and generate second unsolicited grant data 168(2). For example, the second unsolicited grant data 168(2) may specify a particular frequency, timeslot, and so forth that is not specified in the first unsolicited grant data 168(1).

The resource scheduler 170 onboard the satellite 102 may use scheduling input data 176 to determine grant data 172 that allocates communication resources associated with the uplink to the satellite 102. The grant data 172 may comprise the unsolicited grant data 168 or solicited grant data 174. Once determined, the grant data 172 is provided to the UT 108. The unsolicited grant data 168 is provided to the UT 108 without request. In comparison, the solicited grant data 174 is provided in response to a message from the UT 108.

During operation of the system, a UT 108 is handed off from a first satellite 102(1) to a second satellite 102(2). In one implementation state data indicative of a state of a resource scheduler 170(1) of the first satellite 102(1) may be sent to a resource scheduler 170(2) of the second satellite 102(2). In another implementation, the management system 150 may provide state data to the resource scheduler 170(2) of the second satellite 170(2).

The UT 108 includes a communication system 180, such as a satellite network interface, to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data 112 sent by the user device 110 or downstream data 142 that is addressed to the UT 108 or the user device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

The UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The uplink may comprise a plurality of channels. A channel may be a particular combination of one or more of a frequency, time division, modulation, access modalities, and so forth. During operation of the UT 108, an uplink management system 188 may be used to determine one or more messages, such as a short buffer data status (SBDS) 190 or long buffer data status (LBDS) 192. The uplink management system 188 may send these messages using one or more of the channels.

The uplink may comprise a random access channel (RACH). The RACH may be random access in that individual UTs 108 may utilize the RACH on an ad hoc basis without prior knowledge of whether other UTs 108 may be transmitting at that time. The RACH provides the advantage of allowing for on-demand access to the satellite 102, increasing utilization. However, the RACH is susceptible to congestion if too many UTs 108 attempt to use the RACH at the same time. If the RACH is congested, messages from the UT 108 to the satellite 102 may not be received, may be retransmitted, and so forth. By using the techniques described herein, the size and quantity of messages sent using the RACH is reduced, substantially reducing congestion on the RACH. This allows a single satellite 102 to provide communication service to a large number of UTs 108.

The RACH may also implement other techniques, such as a non-orthogonal multiple access (NOMA) to the RACH. A NOMA architecture is able to operate when two or more transmissions at least partially overlap in time and space. For example, a NOMA architecture may operate on the uplink, allowing UT 108(2039) and UT (3939) to both send message to the satellite 102(1) during the same time and using the same frequency(s). While NOMA reduces constraints with regard to time and frequency of transmission on the uplink, there are still limits with regard to congestion on the uplink. For example, performance in a system utilizing NOMA is improved if the individual messages being transmitted are relatively short, have a specified data format, and so forth. Reducing the size of the data sent in the NOMA reduces the time at which any number of transmitters may be simultaneously transmitting, simplifying the decoding process at the receiver. Likewise, the use of a specified data format further facilitates decoding.

The uplink may also include one or more grant channels. Depending upon the implementation, a UT 108 may be allocated one or more grant channels. A grant channel is specified by communication resources specified by the grant data 172. For example, grant data 172 may specify communication resources for the uplink that are assigned to the UT 108, such as a timeslot, frequency slot, modulation, coding scheme, and so forth. The resource scheduler 170 determines the grant data 172 that allocates these communication resources.

During operation, the uplink management system 188 may maintain one or more buffer groups. Each buffer group comprises a buffer queue to store upstream data 112 for transmission to the satellite 102 on the uplink. Each buffer group may be associated with an amount of data that is greater than or equal to zero. Each of these buffer groups may be associated with a particular characteristic. For example, the buffer groups may be associated with priority such that buffer group 0 is associated with highest priority data. Continuing the example, buffer group 5 may be associated with data having a lesser priority than buffer group 0. Priority for data in a buffer group may be determined based on a variety of factors, such as quality of service (QoS) flags for associated data, prior delays in transmission, and so forth. For example, remaining unsent data in buffer group 7 at a first time may be moved to buffer group 4 at a second time.

The uplink management system 188 may use the RACH to send a message such as the short buffer data status (SBDS) 190 to the satellite. The SBDS 190 is relatively short minimizing the overall size of the data transmitted. For example, the SBDS 190 may be 8 bits in length. This reduces transmission time, reducing contention on the RACH. In some implementations the uplink management system 188 may send an SBDS 190 responsive to one or more buffer groups having an amount of data enqueued that exceeds a threshold value. For example, if no upstream data 112 has been enqueued for transmission, no SBDS 190 is sent.

The SBDS 190 provides information about upstream data 112 that a UT 108 has stored for transmission to the satellite 102 on the uplink. This information may include one or more of priority, approximate amount of that data, and so forth. The priority may be designated by a particular buffer group. In one implementation, the uplink management system 188 may indicate the highest priority buffer group that has a nonzero amount of data. For example, if eight levels of priority, or eight buffer groups, are specified in the system, 3 bits in the SBDS 190 may be used to indicate the highest priority buffer group that has a nonzero amount of data. The approximate amount of the data in the specified buffer group may be used to reduce the size of the SBDS 190. For example, if the SBDS 190 allocates 5 bits for approximate amount of data used, there are 32 possible "bins" of quantities of data that may be expressed. Continuing the example, bin 1 may specify an amount of data of 1-10 kb, bin 2 may be 11-100 kb, bin 3 may be 101-5000 kb, and so forth.

Responsive to the SBDS 190 indicating a non-zero amount of data to transfer, the resource scheduler 170 onboard the satellite 102 may issue grant data 172 such as solicited grant data 174. The solicited grant data 174 specifies communication resources for the uplinks that are assigned to the UT 108 that is associated with the SBDS 190. The UT 108 receives the solicited grant data 174, and sends the upstream data 112 that is associated with the SBDS 190. Continuing the example, at least some of the upstream data 112 stored in the specified buffer group may be transmitted.

During operation, the UT 108 may continue to receive or generate upstream data 112 to send to the satellite 102. The uplink management system 188 of the UT 108 may send long buffer data status (LBDS) 192 messages to the satellite 102. The LBDS 192 may comprise more detailed information about the priority and amount of upstream data 112 that has been stored for transmission, compared to the SBDS 190. This additional information in the LBDS 192 assists the resource scheduler 170 onboard the satellite 102 in determining the solicited grant data 174 that maintains desired service level specifications for the different priorities of upstream data 112. For example, the LBDS 192 may comprise a first octet that indicates which of the specified buffer groups have a nonzero amount of data for transmission. The LBDS 192 also includes detailed information about the amount of data in the specified buffer groups. For example, additional octets may be used, one octet comprising data indicative of the amount of data stored in that buffer group.

In some implementations, the LBDS 192 messages may be sent to the satellite 102 using the previously granted uplink communication resources. This avoids the need to send an additional request using the RACH, and thus reducing congestion on the RACH.

The various techniques described in this disclosure may operate concurrently with one another. For example, an SBDS 190 may be sent using the RACH while other upstream data 112 is being sent on the uplink using solicited grant data 174 responsive to LBDS 192 or unsolicited grant data 168.

The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 110. In some implementations the servers 134 may provide content provider data 136. The content provider data 136 may be used by the unsolicited grant system 166, resource scheduler 170, or other portions of the system 100 to facilitate operation. For example, the unsolicited grant system 166 or the resource scheduler 170 may determine and send unsolicited grant data 168 to a UT 108 based on the content provider data 136.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
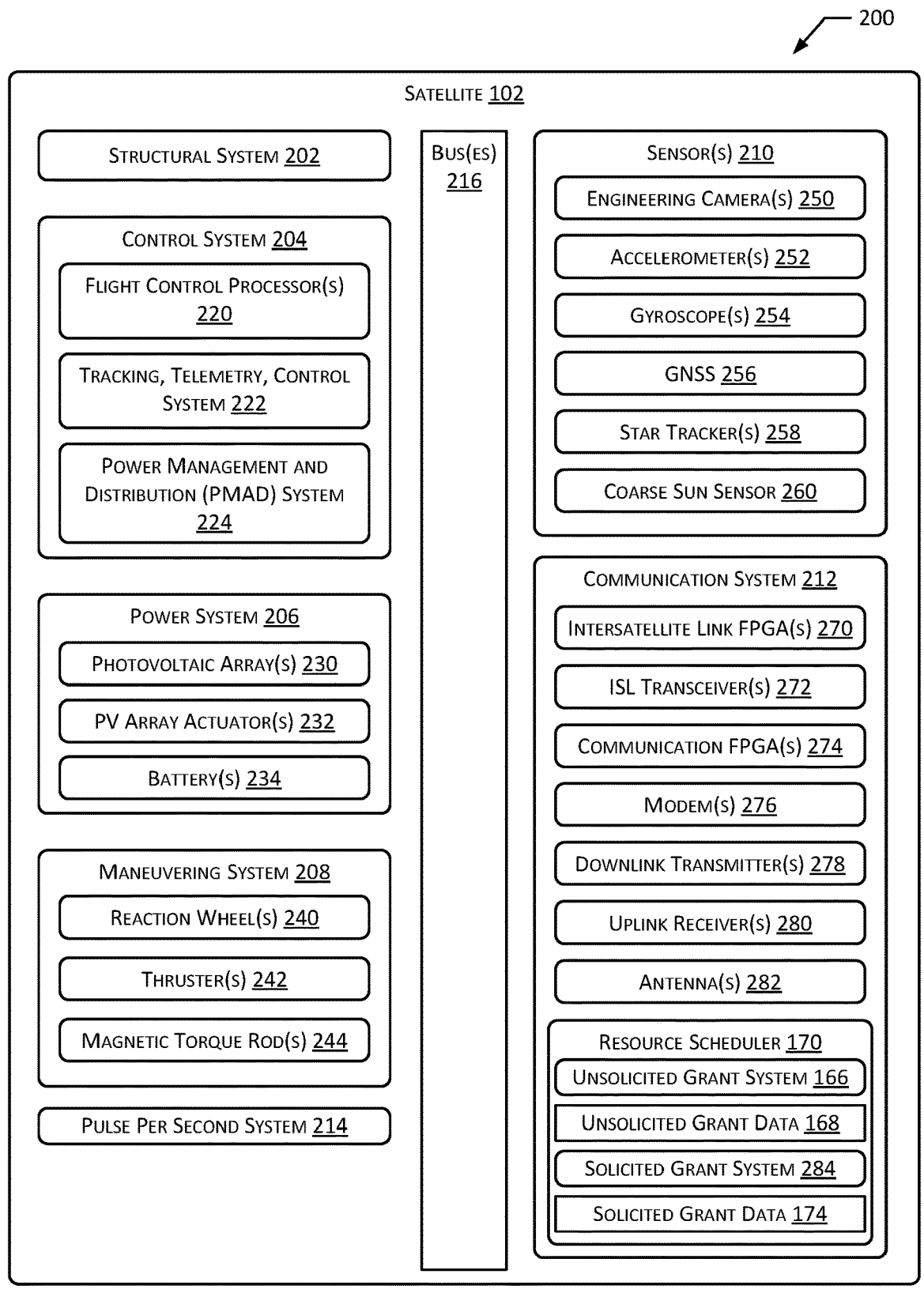
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include a resource scheduler 170 that specifies uplink resources for a UT 108 to communicate with the satellite 102. The resource scheduler 170 may include one or more of a solicited grant system 284 or an unsolicited grant system 166. For example, the communication FPGA 274 may process a message such as an SBDS 190 or LBDS 192 that is received from a UT 108 by the uplink receiver 280. Responsive to the message, and subject to the availability of communication resources associate with the uplink, the solicited grant system 284 of the resource scheduler 170 executing on the communication FPGA 274 may determine solicited grant data 174. The unsolicited grant system 166 of the resource scheduler 170 may also determine and send unsolicited grant data 168 based on the scheduling input data 176. The grant data 172 is then sent using the downlink transmitter 278.

Figure 3:
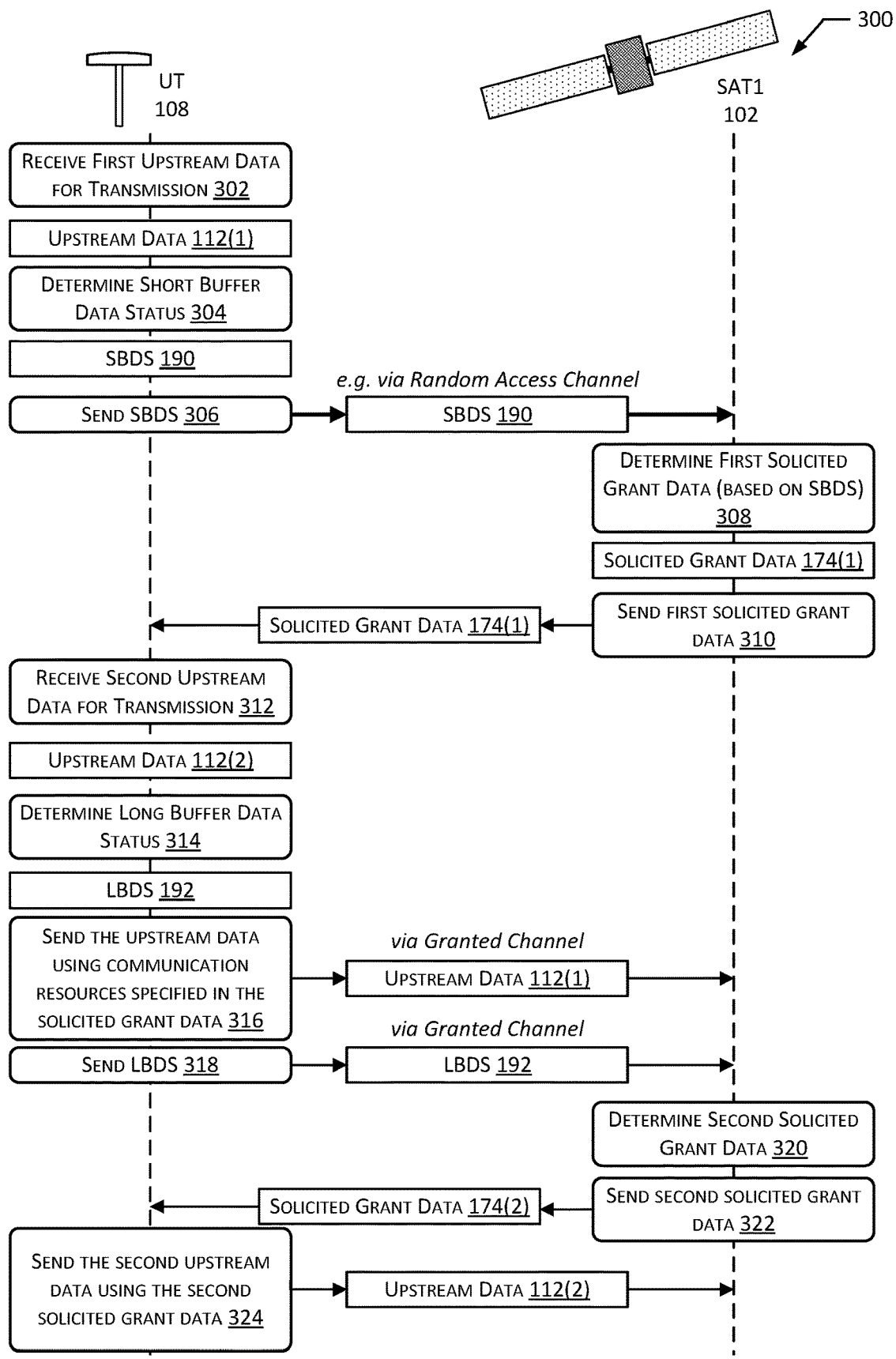
FIG. 3 illustrates a process of providing solicited grants of uplink resources using buffer data status messages from a user terminal, according to some implementations.

FIG. 3 illustrates a process 300 of providing solicited grants of uplink resources using buffer data status messages from a UT 108, according to some implementations. The process may be implemented by one or more of the UT 108 or the satellite 102. In this illustration, time generally increases from top to bottom. For example, an operation depicted at the top of the page may occur before an operation depicted at the bottom of the page.

In this illustration, the first UT 108(1) is in communication with the first satellite 102(1). Other elements of the system 100 are omitted from this illustration for clarity, and not as a limitation.

At 302, the first UT 108(1) receives or generates first upstream data 112(1) for transmission to the satellite 102. For example, the user device 110 may send data to the satellite 102 that has a destination address of a server 134. The first upstream data 112(1) may be stored in a buffer group of the first UT 108(1).

At 304 the first UT 108(1) determines SBDS 190. For example, the uplink management system 188 may determine the highest priority buffer group that has a nonzero amount of data stored therein. In other examples, characteristics other than priority may be used.

At 306 the SBDS 190 is sent from the first UT 108(1) to the satellite 102(1). For example, the first UT 108(1) may send the SBDS 190 using a random access channel (RACH) to the satellite 102(1).

At 308, at the first satellite 102(1), the resource scheduler 170 determines first solicited grant data 174(1) based on the SBDS 190. For example, the resource scheduler 170 may process a plurality of SBDS 190 messages received from a plurality of UTs 108 and allocate uplink resources responsive to those messages.

At 310 the first solicited grant data 174(1) is sent from the first satellite 102(1) to the first UT 108(1).

At 312 second upstream data 112(2) is received for transmission to the first satellite 102(1).

At 314 the first UT 108(1) determines LBDS 192 data. For example, the uplink management system 188 may determine the buffer groups having nonzero quantities of data stored therein, and the amount of data in each.

At 316, the first upstream data 112(1) is sent from the first UT 108(1) to the first satellite 102(1) using the communication resources specified in the first solicited grant data 174(1). For example, the communication system 180 may use the first solicited grant data 174(1) to send the first upstream data 112(1).

At 318 the LBDS 192 is sent from the first UT 108(1) to the satellite 102(1). The LBDS 192 may also be sent to the first satellite 102(1) using the granted channel of the communication resources specified in the first solicited grant data 174(1). In some implementations the resource scheduler 170 may allocate in the grant data 172 sufficient uplink resources to transmit the LBDS 192, should the LBDS 192 be available.

At 320, at the first satellite 102(1), the resource scheduler 170 determines second solicited grant data 174(2) based on the LBDS 192. For example, the resource scheduler 170 may process a plurality of LBDS 192 messages received from a plurality of UTs 108 and allocate uplink resources responsive to those messages.

At 322 the second solicited grant data 174(2) is sent from the first satellite 102(1) to the first UT 108(1).

At 324, the second upstream data 112(2) is sent from the first UT 108(1) to the first satellite 102(1) using the communication resources specified in the second solicited grant data 174(2).

The operations in this figure are shown by way of illustration, and not necessarily as a limitation. For example, operations 312-314 and 318-324 may be omitted.

Figure 4:
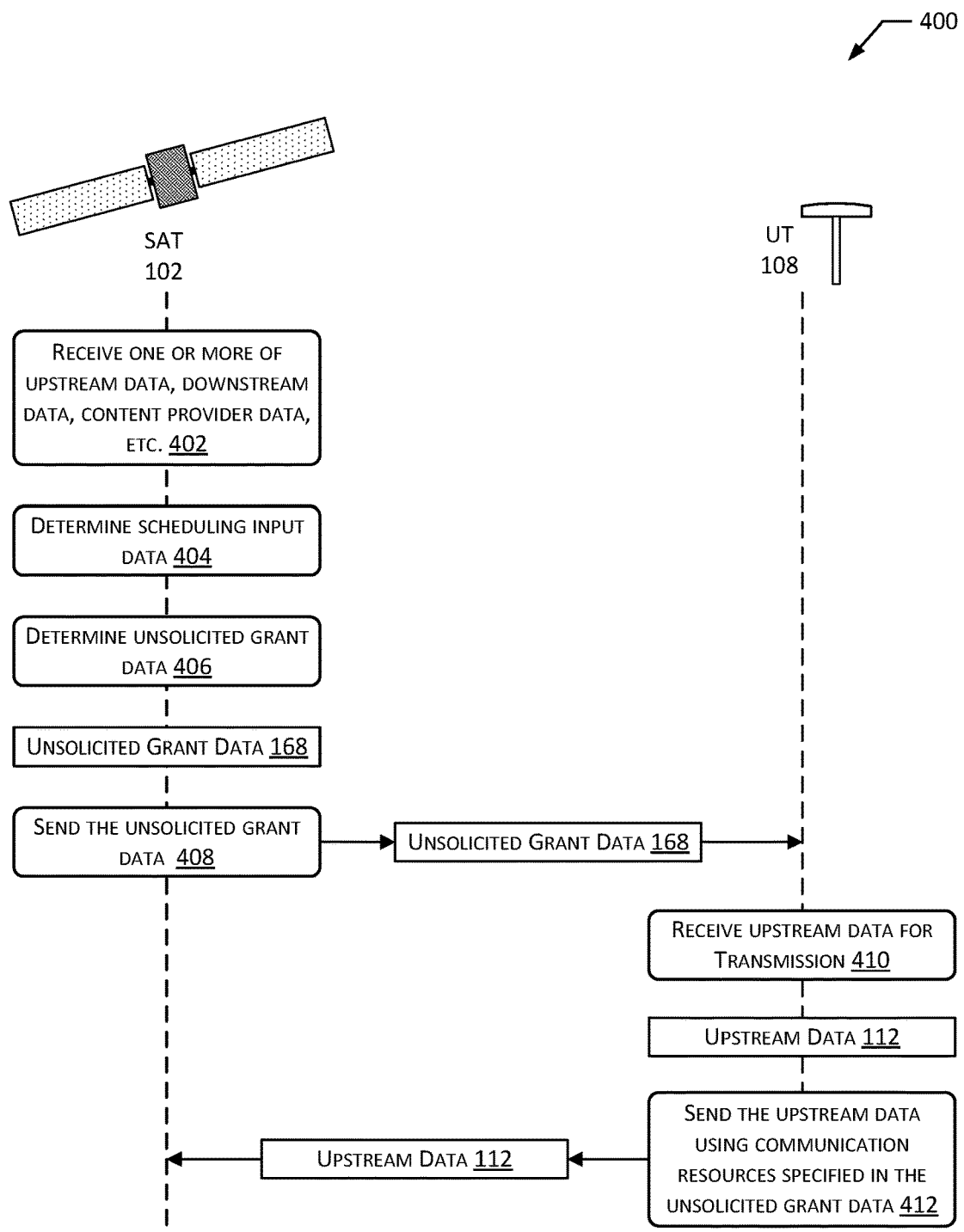
FIG. 4 illustrates a process of providing unsolicited grants of uplink resources to a user terminal based on scheduling input data, according to some implementations.

FIG. 4 illustrates a process 400 of providing unsolicited grants of uplink resources to a UT 108 based on scheduling input data 176, according to some implementations. The process may be implemented by one or more of the unsolicited grant system 166 executing as part of the management system 150 or the resource scheduler 170 onboard the satellite 102. In this illustration, time generally increases from top to bottom. For example, an operation depicted at the top of the page may occur before an operation depicted at the bottom of the page.

At 402 one or more of upstream data 112, downstream data 142, content provider data 136, or other information is received. For example, the satellite 102 may receive upstream data 112 from a UT 108, receive downstream data 142 from a ground station 106 for delivery to the UT 108, and so forth. In another example, the management system 150 may receive upstream data 112 from the UT 108 via the satellite 102, downstream data 142 from the server 134 for delivery to the UT 108, and so forth.

At 404 scheduling input data 176 is determined. The scheduling input data 176 may comprise information about transferred data sent via the satellite 102 and involving a particular UT 108. The scheduling input data 176 may comprise information about packet fixed headers, packet extension headers, packet payload, and so forth. Transfer history data may comprise information that is indicative of a direction of transferred data (uplink or downlink with respect to the satellite), source address, destination address, data transferred per unit time, buffer group or priority of that data transferred per unit time, and so forth. The scheduling input data 176 is discussed in more detail with regard to FIG. 8. In some implementations the scheduling input data 176 may also comprise one or more of SBDS 190, LBDS 192, or other messages received from the UT 108.

The scheduling input data 176 may comprise the content provider data 136 received from one or more servers 134. The content provider data 136 may indicate an expected duration of time that is associated with a data transfer. For example, if the user device 110 requests video content that is 87 minutes long, the content provider data 136 may indicate the expected duration is 87 minutes, expected downstream data rate per unit time, expected upstream data rate per unit time, and so forth. Based on this information, the unsolicited grant system 166, the resource scheduler 170, or other portions of the system 100 may determine and send unsolicited grant data 168 to a UT 108. Continuing the example, if the upstream acknowledgement packets for the video content is expected to be 125 kb/second, the resource scheduler 170 may issue unsolicited grant data 168 to accommodate this usage on the uplink. This is discussed in more detail with regard to FIG. 5.

In some situations, the expected duration of the content may exceed a time that a particular satellite 102 provides communication services to the UT 108. For example, the satellite 102 in LEO may only be within communication range of the UT 108 for a few minutes. The content provider data 136 may be persisted, refreshed, sent to, or otherwise be available to one or more parts of the system 100 to maintain ongoing operations. For example, the management system 150 may use the content provider data 136 and send scheduling messages to the resource scheduler 170 of a satellite 102 currently providing service to the UT 108 associated with that content provider data 136. In some implementations, the content provider data 136 or scheduling message provided to the resource scheduler 170 may be a subset of, or based on, the content provider data 136 received from the server(s) 134. For example, the scheduling message sent to the resource scheduler 170 on the satellite 102 may comprise metadata that is associated with the content, with the metadata indicating "this transfer will continue throughout the entire pass".

At 406 unsolicited grant data 168 is determined. In one implementation, the unsolicited grant system 166 or the resource scheduler 170 may comprise a machine learning system trained to determine unsolicited grant data 168 based on the scheduling input data 176. The machine learning system may be trained in an ongoing fashion, continuing to update itself to improve performance. The machine learning system may include one or more of a convolutional neural network, random forest classifier, semi-persistent scheduler, memory inference scheduling, and so forth. In some implementations, the state data associated with the machine learning system may be transferred from one resource scheduler 170 to another.

The unsolicited grant system 166 or the resource scheduler 170 may, instead of or in addition to a machine learning system, utilize a deterministic system. For example, the deterministic system may use one or more heuristics, comparison of specified parameters and values to thresholds, and so forth, to determine the unsolicited grant data 168. For example, for every packet of downstream data 142 that uses the Transmission Control Protocol (TCP), the unsolicited grant system 166 may allocate uplink resources to accommodate a responsive acknowledgement ("ACK") packet.

At 408 the unsolicited grant data 168 is sent from the satellite 102 to the UT 108.

At 410 upstream data 112 is received by the UT 108 for transmission to the satellite 102. For example, the user device 110 may send the upstream data 112 to the UT 108. The unsolicited grant data 168 may be received before or after receipt of the upstream data 112.

At 412, the upstream data 112 is sent from the UT 108 to the satellite 102 using the communication resources specified in the unsolicited grant data 168.

As shown in this illustration, the prospective issuance of the unsolicited grant data 168 to the UT 108 removes the necessity for the UT 108 to send a message to the satellite 102 requesting uplink resources. This reduces congestion on one or more of the RACH, the granted channel(s), and also substantially reduces overall system latency. For example, the reduction in latency is realized by removing the time associated with sending the SBDS 190, having the SBDS 190 processed by the resource scheduler 170, and the time associated with sending solicited grant data 174 to the UT 108.

Figure 5:
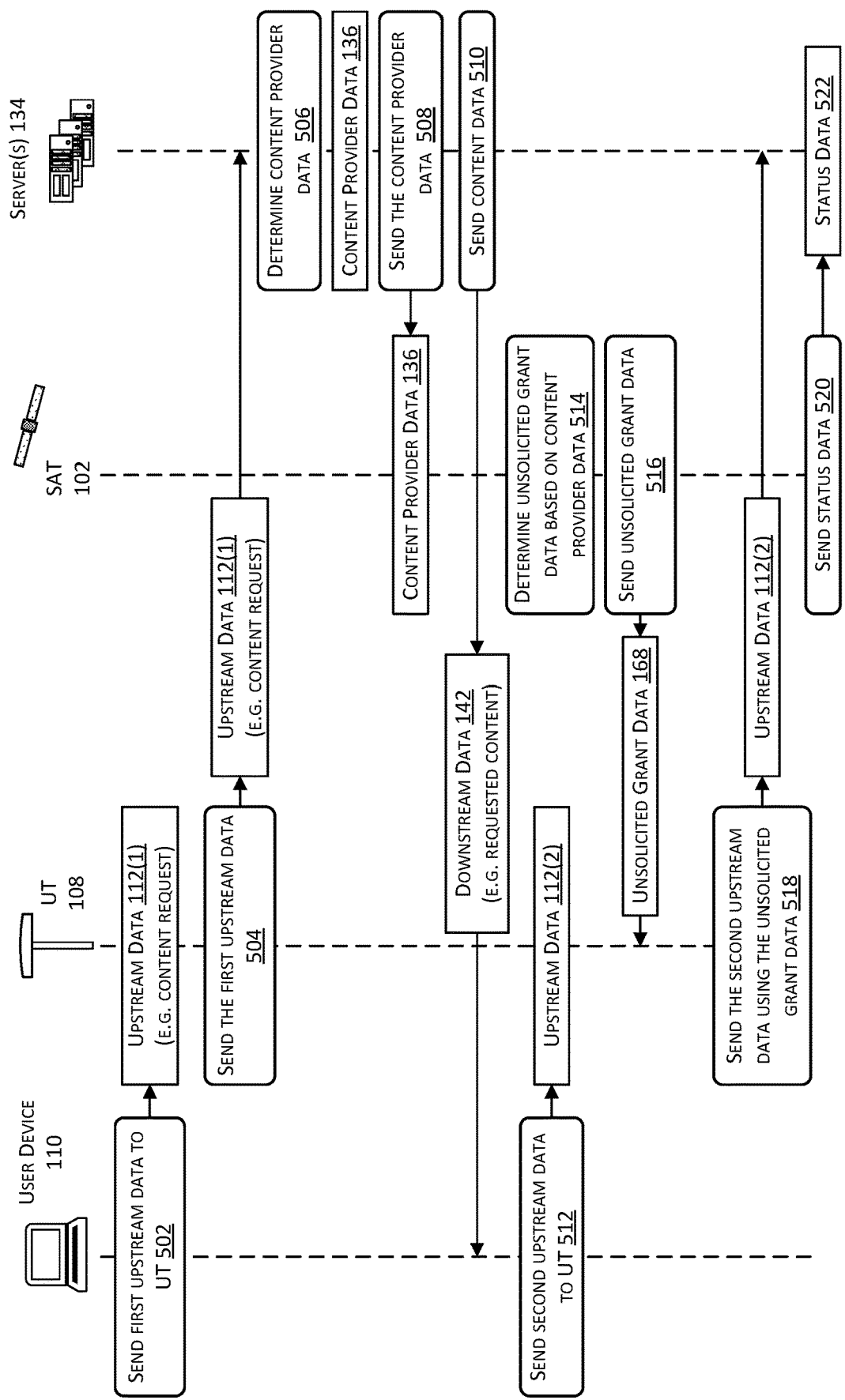
FIG. 5 illustrates a process of using content provider data to determine unsolicited grants of uplink resources to a user terminal, according to some implementations.

FIG. 5 illustrates a process 500 of using content provider data 136 to determine unsolicited grants of uplink resources to a UT 108, according to some implementations.

At 502 a user device 110 generates first upstream data 112(1) and sends this upstream data 112(1) to the UT 108. For example, the first upstream data 112(1) may be a request for the server 134 to begin streaming content titled "Movie1". In another example, the first upstream data 112(1) may be a request for the server 134 to begin a scheduled video call.

At 504 the UT 108 sends the first upstream data 112(1) to the server 134 via to the satellite 102. For example, the techniques described with regard to FIG. 3 or 4 may be used to request solicited grant data 174 from the satellite 102. The communication resources indicated by the solicited grant data 174 may then be used to send the first upstream data 112(1).

At 506 the server 134 determines content provider data 136. For example, the server 134 determines the content provider data 136 responsive to the upstream data 112(1) that requests video content. Continuing the example, responsive to the request for "Movie1" the server 134 may retrieve information indicative of the total length of presentation of the video content.

At 508 the content provider data 136 is sent from the server 134 to the satellite 102. For example, the resource scheduler 170 onboard the satellite 102 may receive the content provider data 136. In another implementation the content provider data 136 may be sent to the unsolicited grant system 166 of the management system 150.

In some implementations the content provider data 136 may be sent on a recurring schedule, upon a change in status of delivery of content, and so forth. For example, the content provider data 136 may be sent from the server 134 every 10 seconds while content is being provided. In another example, the content provider data 136 may be sent when content presentation starts, stops, changes bitrates, and so forth.

At 510 the server 134 may begin sending downstream data 142 to the user device 110. For example, the downstream data 142 may comprise a first portion of the requested content, such as "Movie1". The downstream data 142 is sent via the satellite 102 and the UT 108 to the user device 110.

At 512 the user device 110 sends second upstream data 112(2) to the UT 108. For example, the user device 110 may receive the first portion of the requested content that is included in the downstream data 142, and the resulting upstream data 112(2) may comprise acknowledgement messages that are to be returned to the server 134.

At 514 unsolicited grant data 168 is determined based at least in part on the content provider data 136. For example, the resource scheduler 170 may use the content provider data 136 to determine and issue unsolicited grant data 168.

At 516 the unsolicited grant data 168 is sent from the satellite 102 to the UT 108.

At 518 the second upstream data 112(2) is sent from the UT 108 to the satellite 102 using the unsolicited grant data 168. The second upstream data 112(2) may then be sent ultimately to the server 134.

As shown in this illustration, the prospective issuance of the unsolicited grant data 168 to the UT 108 removes the necessity for the UT 108 to send a message to the satellite 102 requesting uplink resources. This reduces congestion on one or more of the RACH, the granted channel(s), and also substantially reduces overall system latency. For example, the reduction in latency is realized by removing the time associated with sending the SBDS 190, having the SBDS 190 processed by the resource scheduler 170, and the time associated with sending solicited grant data 174 to the UT 108. The content provider data 136 provides additional information to the resource scheduler 170 or unsolicited grant system 166 to take into consideration information such as a particular duration, expected uplink data rate, and so forth.

The operations in this figure are shown by way of illustration, and not necessarily as a limitation. The ordering of some operations may change depending upon circumstances. For example, one or more of the operations of 510 and 516 may occur before 512. For example, the unsolicited grant data 168 may be included with the downstream data 142.

In some implementations, at 520 status data 522 may be determined and sent to the one or more servers 134. For example, the resource scheduler 170 onboard the satellite 102 may send status data 522 to the servers 134. In another implementation the management system 150 may send status data 522 to the servers 134.

The status data 522 may be indicative of one or more of available bandwidth, network congestion, a request to decrease rate of data transfer, information indicative that an increase rate of data transfer is permissible, and so forth. For example, the resource scheduler 170 may send status data 522 to the server 134 indicating that the satellite 102 is experiencing congestion in transferring data. In response, the server 134 may begin sending downstream data 142 at a lower bitrate. Continuing the example, after receiving the data from the resource scheduler 170, the server 134 may transition from sending a high resolution version of a movie at 5 megabits per second to sending a lower resolution version of the same movie at a lower bit rate of 1.5 megabits per second.

By facilitating the interaction between the resource scheduler 170 and the server 134 or other device, the system 100 is better able to provide service to UTs 108. For example, during peak times for video streaming such as during local evening, the servers 134 providing video content may transition to sending lower resolution and thus lower bitrate content. This allows content to still be delivered during congested conditions while preventing service outages.

Figure 6:
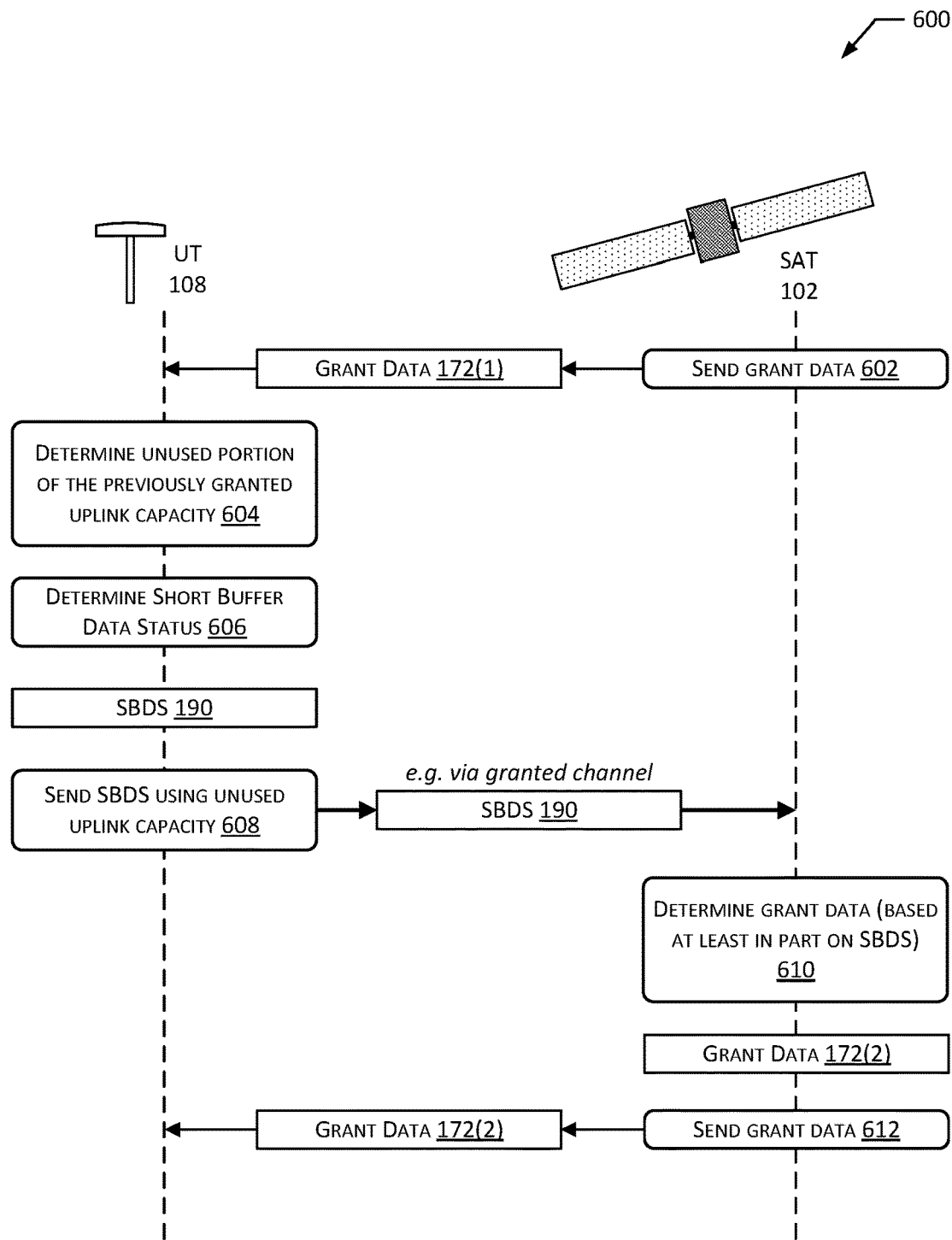
FIG. 6 illustrates a process of using unused uplink capacity to send buffer data status messages, according to some implementations.

FIG. 6 illustrates a process 600 of using unused uplink capacity to send messages such as an SBDS 190 or LBDS 192, according to some implementations. In some situations, the grant data 172 may allocate communication resources that would otherwise be unused. For example, the user device 110 may not send expected upstream data 112 at an expected time. This otherwise unused capacity may be opportunistically used to send the SBDS 190 or LBDS 192, depending upon available capacity.

At 602 the satellite 102 sends first grant data 172(1) to the UT 108. For example, the grant data 172 may comprise one or more of unsolicited grant data 168, solicited grant data 174, and so forth.

At 604 the UT 108 determines there is an unused portion of the previously granted uplink capacity. For example, the uplink management system 188 may determine that the capacity allocated by the grant data 172(1) exceeds the amount of data stored in the buffers for transmission. Based on the unused uplink capacity, the uplink management system 188 may determine a message such as an SBDS 190 or LBDS 192 that will fit within the unused uplink capacity. In the following illustration, SBDS 190 is shown. In other implementations LBDS 192 may be determined and sent.

At 606 a message is determined at the UT 108. For example, the SBDS 190 is determined based on the amount of data stored that is associated with a highest priority buffer group.

At 608 the message is sent from the UT 108 to the satellite 102 using the granted channel. For example, the SBDS 190 may be sent along with other upstream data 112 (not shown) using the granted communication resources. In some implementations the message may include information about the downlink as determined at the UT 108. For example, the message may include downlink report data that is indicative of received signal strength, bit error rate, and so forth. This information may be used by the satellite 102 to facilitate operation. For example, if the received signal strength is below a threshold value or the bit error rate is greater than a threshold value, the communication system 212 may use a different modulation, increase transmit power, and so forth.

In some implementations padding may be inserted into the unused uplink capacity. For example, if 64 bits of uplink capacity are unused, 64 bits of data may be generated and sent using the granted channel.

At 610 second grant data 172(2) is determined at the satellite 102. For example, the resource scheduler 170 onboard the satellite 102 uses the SBDS 190 or LBDS 192 to determine the second grant data 172(2). In some implementations, if no upstream data 112 is in the buffers of the UT 108, no grant data 172 may be determined.

At 612 the second grant data 172(2) is sent to the UT 108. The UT 108 may then use the second grant data 172(2) to send upstream data 112.

In some implementations the messages from the UT 108 may be indicative of no upstream data 112 for transfer. For example, the SBDS 190 or the LBDS 192 may indicate that buffers have zero data for transfer. This may occur in situations resulting from a reset of the UT 108, reset of the uplink management system 188, cancellation of transmission of upstream data 112, failure to receive expected upstream data 112, and so forth. The resource scheduler 170 may use this information to deallocate grant data 172. For example, if the user device 110 has stopped communicating, and the upstream data 112 buffers are starved, the resource scheduler 170 may deallocate previously used grant data 172 or prevent further issuance of unsolicited grant data 168. This behavior minimizes the occurrence of unused uplink resources and improves overall performance of the system 100.

Figure 7:
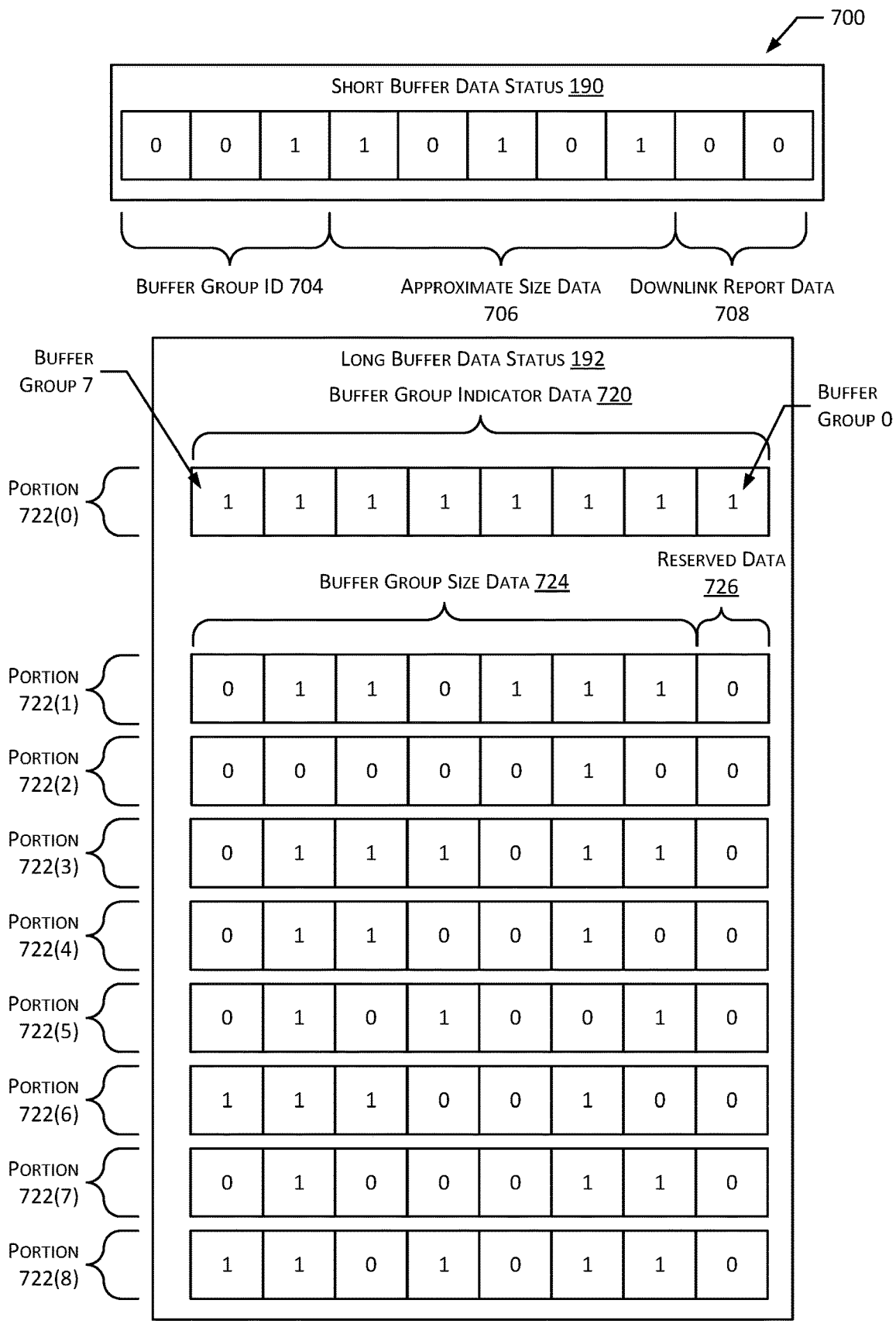
FIG. 7 illustrates a short buffer data status message and a long buffer data status message, according to some implementations.

FIG. 7 illustrates at 700 an SBDS 190 message and a LBDS 192 message, according to some implementations.

In the implementation shown here, the SBDS 190 consists of a buffer group identifier (ID) 704, approximate size data 706, and downlink report data 708.

The buffer group ID 704 specifies a buffer group, such as maintained by the uplink management system 188 of the UT 108. In this illustration, 3 bits are allocated for the buffer group ID 704, corresponding to 8 buffer groups or characteristics used by the system 100. For example, buffer groups may be indicative of priority, service level requirements, and so forth.

The approximate size data 706 comprises an approximate amount of upstream data 112 enqueued for transmission on the uplink that is associated with the specified buffer group. The amount of the data in the specified buffer group may be quantized to reduce the bit size of the approximate size data 706 within the SBDS 190. For example, a size of an amount of data in the specified buffer group may be determined. That size may then be quantized to lower resolution, and thus fewer bits to produce the approximate size data 706. In this illustration the SBDS 190 allocates 5 bits for approximate size data 706, there are 32 possible quantization levels or "bins" of quantities of data that may be expressed. Continuing the example, bin 1 may specify an amount of data of 1-10 kb, bin 2 may be 11-100 kb, bin 3 may be 101-5000 kb, and so forth.

In some implementations the uplink management system 188 may select the buffer group with the highest priority that contains a nonzero amount of data. For example, buffer group 0 (highest priority) has zero data for transfer, buffer group 1 has 4096 bytes for transfer, and buffer group 2 has 202,105 bytes for transfer. Continuing the example, the uplink management system 188 may indicate the buffer group ID 704 with a decimal value of "1", and the approximate size data 706 would be representative of the 4096 bytes, indicating "bin 1" or a binary value of 00001. In other implementations, other techniques may be used to select a different buffer group for use in the SBDS 190.

In some implementations the SBDS 190 may include additional information. As shown here, downlink report data 708 may be included. The downlink report data 708 may provide some information regarding one or more characteristics of the downlink from the satellite 102 to the UT 108. For example, the downlink report data 708 may be indicative of one or more of received signal strength of a downlink from the satellite 102, signal to noise ratio (SNR) of a received signal from the satellite 102, bit error rate (BER) of the received signal from the satellite 102, and so forth. In some implementations the downlink report data 708 may be quantized. In this illustration the downlink report data 708 comprises 2 bits, allowing for the representation of 4 possible values. In one implementation, a downlink score may be calculated based on the received signal strength, SNR, BER and so forth. The downlink score may then be quantized into one of the 4 possible values for inclusion in the SBDS 190.

Due to the size constraints of the SBDS 190, resolution of the information provided is relatively low. For example, due to quantization, the approximate size data 706 and the downlink report data 708 contain less information than corresponding information in the LBDS 192. Furthermore, the SBDS 190 may be limited as shown to providing the approximate size data 706 for a single buffer group ID 704.

The LBDS 192 provides higher resolution information about the uplink buffers and the data therein, compared to the SBDS 190. The LBDS 192 may include one or more portions 722(0)-(N). In one implementation, each portion 722 may comprise an octet that is 8 bits in length. A first portion 722(0) provides buffer group indicator data 720. In one implementation shown here, each bit position indicates whether a particular buffer group that is associated with that bit position contains a zero amount data (indicted by a binary value of "0") or contains a nonzero amount of data (indicated by a binary value of "1"). The buffer group ID 704 of 0 (highest priority) is associated with the rightmost bit, while the buffer group ID 704 of 7 (lowest priority) is associated with the leftmost bit. In other implementations, other bit arrangements may be used. In this illustration, each buffer group has data stored for transmission.

In other implementations, the buffer groups may be used to specify other characteristics. For example, buffer group may specify a particular range of latencies for data transfer. Continuing this example, buffer group 0 may be associated with first latency value while buffer group 1 is associated with a second latency value. In another example, the buffer group may be associated with a particular protocol, port, and so forth. Continuing this example, buffer group 0 may be associated with data sent using the user datagram protocol (UDP) while buffer group 1 is associated with data sent using the transmission control protocol (TCP).

In the implementation shown here, the LBDS 192 includes additional portions 722(1)-(8), one portion 722 being associated with each buffer group ID 704 that has a nonzero value. The portions 722(1)-(8) may comprise buffer group size data 724 that is indicative of the amount of data stored in the respective buffer group for transmission on the uplink. In this illustration, the buffer group size data 724 is 7 bits in length, providing 128 quantized states to indicate the amount of data. In this implementation, the bit length of the buffer group size data 724 is greater than the approximate size data 706 of the SBDS 190. This additional information provides higher resolution information about the amount of data to be sent on the uplink that is associated with the respective buffer group. In some implementations the portions 722 may include one or more bits of reserved data 726. The reserved data 726 may be used to convey other information about the buffer group or data therein. For example, the reserved data 726 may be used to indicate whether the contents of the respective buffer group are going to be transferred to the next highest priority buffer group during a next processing interval, discarded due to expiration during a next processing interval, and so forth.

In some implementations the LBDS 192 may include downlink report data 708. For example, the LBDS 192 may include additional portions 722(9)-(11) and each may have a bit length of 8 and provide information, respectively, about received signal strength of a downlink from the satellite 102, signal to noise ratio (SNR) of a received signal from the satellite 102, or bit error rate (BER) of the received signal from the satellite 102.

As described above, by providing the SBDS 190 and the LBDS 192 the resource scheduler 170 is able to effectively determine grant data 172 for the UT 108.

FIG. 8 illustrates at 800 scheduling input data 176, according to some implementations. The scheduling input data 176 may be determined based on one or more of upstream data 112, downstream data 142, or other information such as the content provider data 136. The scheduling input data 176 may include a parameter 804 and an associated value 806. In some implementations the scheduling input data 176 may be associated with a particular UT 108. In other implementations, the scheduling input data 176 may be analyzed to determine patterns in the transfer of data. Based on these patterns, specific grant data 172 for a particular UT 108 may be determined.

The scheduling input data 176 may comprise transferred data 802 or data based thereon. For example, the transferred data 802 may comprise data transferred, such as one or more of the upstream data 112 or the downstream data 142.

The transferred data 802 may comprise one or more headers. For example, packets compliant with Internet Protocol (IP) may include a packet fixed header 812, a packet extension header 814, a packet payload 816, and so forth. For example, the packet fixed header 812 may comprise version data, traffic class data, flow label data, source address, destination address, and so forth. In another example, the packet extension header 814 may comprise routing data, fragmentation data, authentication data, encapsulating security data, destination option data, host identity protocol data, and so forth.

One or more of the packet fixed header 812 or the packet extension header 814 may be implemented consistent with the Internet Protocol Version 6 (IPv6) specification promulgated by the Internet Engineering Task Force (IETF). (See Deering, S., "Internet Protocol, Version 6 (IPv6) Specification", RFC 8200, DOI 10.17487/RFC8200, July 2017, www.rfc-editor.org/info/rfc8200.) For example, the version data indicates the version of internet protocol in use. The traffic class data indicates the class of data for use in differentiated services and explicit congestion notification. The flow label may comprise data provided by a source of the transferred data 802 to label sequences of packets that are to be treated as a single flow. The source address is indicative of the source of the transferred data 802. The destination address is indicative of the destination address to which the transferred data 802 is to be delivered. The routing data is indicative of one or more intermediate network nodes that were used to transfer the packet. The fragment data is data that is used by a source of the transferred data 802 to indicate that data having a bit size larger than would otherwise fit within a single message transfer unit to the destination has been fragmented across several packets. The authentication header data and encapsulating security data are indicative of authentication and encapsulation associated with the transferred data 802. (See Kent, S., "IP Authentication Header", RFC 4302, DOI 10.17487/RFC4302, December 2005, www.rfc-editor.org/info/rfc4302.) The destination options data may comprise optional information to be examined by a destination node. The host identity protocol data may comprise data such as digital certificates to implement a host identity name space. (See Moskowitz, Ed., "Host Identity Protocol Version 2 (HIPv2)", RFC 7401, DOI 10.17487/RFC7401, April 2015, www.rfc-editor/info/rfc7401.)

During operation the resource scheduler 170, unsolicited grant system 166, or other systems may analyze the transferred data 802. For example, the resource scheduler 170 may compare source address, destination address, sequence numbers, and so forth to determine a particular packet in upstream data 112 is associated with a particular packet in downstream data 142. Based on this, the resource scheduler 170 may determine unsolicited grant data 168 for subsequent downstream data 142 to accommodate the expected upstream data 112.

The scheduling input data 176 may comprise transfer history data 820. For example, the transferred data 802 may be summarized to produce the transfer history data 820. The transfer history data 820 may include one or more parameters 804 and values 806 such as direction (uplink or downlink), source address, destination address, buffer group, data transferred per unit time, and so forth. For example, the transfer history data 820 may indicate that UT 108(2039) has sent upstream data 112 to server 134(3994), with a priority associated with buffer group 2, at an average data rate of 127 kb/second. The transfer history data 820 may also be indicative of downstream data 142.

The content provider data 136 may comprise one or more parameters 804 and values 806 such as source address, destination address, expected duration, expected end time, expected downlink data rate per unit time, expected uplink data rate per unit time, protocol used, periodicity of data transfer, and so forth. For example, the expected duration may be indicative of an expected time such as seconds that the server 134 is expecting to be sending content to the UT 108 or user device 110 connected thereto. In another example, the periodicity of data transfer may indicate an expected recurring time interval at which data is expected to be transferred. For example, content that involves real-time speech may have a periodicity of 20 milliseconds, indicating that a packet representing speech is expected to be transferred every 20 milliseconds.

As described above, by using the content provider data 136 one or more of the unsolicited grant system 166 or the resource scheduler 170 is able to more accurately determine unsolicited grant data 168.

The scheduling input data 176 may include one or more of the SBDS 190, LBDS 192, or other messages received from the UTs 108.

In some implementations, scheduling input data 176 may include previously sent grant data 172, or information based thereon. A variance between grant data 172 issued and the actual utilization of those resources may be used to modify operation of the resource scheduler 170. For example, if unsolicited grant data 168 is issued with a destination address of "2001:0dY5" and only 15% of the uplink resources associated with the unsolicited grant data 168 were used, the resource scheduler 170 may discontinue issuing unsolicited grant data 168 for traffic associated with that destination address.

The resource scheduler 170 may implement one or more deterministic techniques, machine learning techniques, or combinations thereof. For example, the deterministic system may respond to SBDS 190 and LBDS 192 messages and determine solicited grant data 174. Continuing the example, a machine learning system may be trained to use one or more parameters 804 and values 806 of the scheduling input data 176 to determine unsolicited grant data 168. In some implementations combinations of these techniques may be implemented.

The scheduling input data 176 may comprise information associated with operation of the resource scheduler 170. In one implementation the resource scheduler 170 may use a machine learning system to learn whether to issue unsolicited grant data 168. The scheduling input data 176 may comprise machine learning parameters such as one or more feature vectors, neural network node weights, and so forth that are associated with operation. For example, the scheduling input data 176 may comprise state data associated with the machine learning algorithm. In some implementations, this state data may be transferred to another resource scheduler 170. For example, the resource scheduler 170(1) executing on the first satellite 102(1) may send the state data to the resource scheduler 170(2) executing on the second satellite 102(2) that is scheduled to provide communication services to the UT 108.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first user terminal (UT) comprising:
a first network interface;
a second network interface; and
a first set of one or more processors executing instructions to:
receive, using the first network interface, first data;
determine a size of the first data, wherein the size is expressed with a first number of bits;
determine a first amount of data by representing the size with a second number of bits, wherein the second number of bits is less than the first number of bits;
determine, based on the first data, second data that is indicative of:
the first amount of data in the first data, and
a first priority associated with the first data;
send, using the second network interface, the second data on a shared channel to a first satellite;
receive, using the second network interface, third data indicative of communication resources associated with an uplink to the first satellite, wherein the third data is responsive to the second data; and
send, based on the third data, the first data using the second network interface.

2. The system of claim 1, the first set of one or more processors further executing the instructions to:
receive, using the first network interface, fourth data;
determine, based on the fourth data, fifth data that is indicative of:
a first amount of data in the fourth data that is associated with the first priority, and
a second amount of data in the fourth data that is associated with a second priority;
send, using the second network interface, the fifth data to the first satellite;
receive, using the second network interface, sixth data indicative of communication resources associated with the uplink to the first satellite; and
send, based on the sixth data, the fourth data to the first satellite using the second network interface.

3. The system of claim 2, wherein the fifth data is sent using the communication resources specified by the third data.

4. The system of claim 1, further comprising:
a memory; and
the first set of one or more processors further executing the instructions to:
store the first data in the memory; and
wherein the size of the first data is based on the first data as stored in the memory.

5. The system of claim 1, the first set of one or more processors further executing the instructions to:
receive, using the second network interface, fourth data indicative of communication resources associated with the uplink to the first satellite, wherein the fourth data is not responsive to a request sent from the first UT;
receive, using the first network interface, fifth data; and
send, based on the fourth data, the fifth data using the second network interface.

6. The system of claim 1, further including the first satellite, the first satellite comprising:
a third network interface; and
a second set of one or more processors executing instructions to:
determine fourth data that is indicative of one or more of:
data transferred between the first UT and the first satellite, or
fifth data that is indicative of an expected duration of a data transfer to the first UT;
determine, based on the fourth data, sixth data indicative of communication resources associated with the uplink to the first satellite; and
send the sixth data to the first UT using the third network interface.

7. The system of claim 1, wherein the shared channel is accessed by the first UT randomly with respect to time and using a non-orthogonal multiple access (NOMA) protocol.

8. The system of claim 1, wherein the second data is further indicative of one or more of:
a received signal strength of a downlink from the first satellite,
a signal to noise ratio (SNR) of a received signal from the first satellite, or
a bit error rate of the received signal from the first satellite.

9. A system comprising:
a first satellite comprising:
a first network interface; and
a first set of one or more processors executing instructions to:
receive first data from a first user terminal (UT), wherein the first data comprises:
a first amount of data that has been quantized based on a second amount of data that is expressed with a first bit resolution, wherein the first amount of data is expressed with a second bit resolution that is lower than the first bit resolution, and a first characteristic associated with the first amount of data;

determine second data that is associated with data transmission with the first UT based on the first data;

determine, based on the second data, third data indicative of communication resources associated with an uplink to the first satellite; and send the third data to the first UT using the first network interface.

10. The system of claim 9, wherein the second data comprises one or more of:

upstream packet header information associated with upstream data received from the first UT on the uplink;

upstream packet extension header information associated with the upstream data;

downstream packet header information associated with downstream data sent to the first UT on a downlink;

downstream packet extension header information associated with the downstream data;

upstream history data indicative of upstream data previously received by the first satellite from the first UT;

downstream history data indicative of downstream data previously sent by the first satellite to the first UT;

an expected duration of data transmission to the first UT;

an expected end time of data transmission to the first UT;

an expected rate of upstream data transmission from the first UT; or an expected rate of downstream data transmission to the first UT.

11. The system of claim 9, wherein:

the first data is received from the first UT on a channel that is shared with a plurality of UTs.

12. The system of claim 11, further comprising the first UT, the first UT comprising:

a first memory;

a second network interface; and a second set of one or more processors executing instructions to:

store the second amount of data in the first memory;

determine a size of the second amount of data as stored in the first memory, wherein the size is expressed with the first bit resolution; and determine the first amount of data by quantizing the size of the second amount of data.

13. The system of claim 9, wherein the first characteristic is indicative of a priority of data enqueued for transmission to the first satellite.

14. The system of claim 9, wherein at least a portion of the second data is indicative of one or more of:

a received signal strength of a downlink from the first satellite to the first UT, a signal to noise ratio (SNR) of a received signal from the first satellite by the first UT, or a bit error rate of the received signal from the first satellite as received by the first UT; and the first set of one or more processors further executing the instructions to:

operate the first network interface based in part on the at least a portion of the second data.

15. A method comprising:

receiving, at a first satellite, first data from a first user terminal (UT), wherein the first data comprises:

a first amount of data that has been quantized based on a second amount of data that is expressed with a first bit resolution, wherein the first amount of data is expressed with a second bit resolution that is lower than the first bit resolution, and a first characteristic associated with the first amount of data;

determining, at the first satellite, second data that is associated with data transmission with the first UT based on the first data;

determining, at the first satellite and based on the second data, third data indicative of communication resources associated with an uplink to the first satellite; and sending, from the first satellite, the third data to the first UT.

16. The method of claim 15, wherein the second data comprises one or more of:

upstream packet header information associated with upstream data received from the first UT on the uplink;

upstream packet extension header information associated with the upstream data;

downstream packet header information associated with downstream data sent to the first UT on a downlink;

downstream packet extension header information associated with the downstream data;

upstream history data indicative of upstream data previously received by the first satellite from the first UT;

downstream history data indicative of downstream data previously sent by the first satellite to the first UT;

an expected duration of data transmission to the first UT;

an expected end time of data transmission to the first UT;

an expected rate of upstream data transmission from the first UT; or an expected rate of downstream data transmission to the first UT.

17. The method of claim 15, further comprising:

determining, at the first UT, the first amount of data and the first characteristic associated with the first amount of data.

18. The method of claim 15, further comprising:

determining, at the first UT, the second amount of data; and determining, at the first UT, the first amount of data by quantizing the second amount of data.

19. The method of claim 15, wherein the first characteristic is indicative of a priority of data being transmitted to the first satellite.

20. The method of claim 15, wherein:

at least a portion of the second data is indicative of one or more of:

a received signal strength of a downlink from the first satellite to the first UT, a signal to noise ratio (SNR) of a received signal from the first satellite by the first UT, or a bit error rate of the received signal from the first satellite as received by the first UT; and the method further comprising:

operating, at the first satellite, a first network interface based at least in part on the at least a portion of the second data.

\* \* \* \* \*